United States Patent [19]

Hardman

[11] 3,880,703

[45] Apr. 29, 1975

[54] TREATMENT OF PHOSPHATE SLIMES

[76] Inventor: Gilbert J. Hardman, 4490 Marine Dr., West Vancouver, British Columbia, Canada

[22] Filed: Mar. 4, 1974

[21] Appl. No.: 448,106

[30] Foreign Application Priority Data
Sept. 4, 1973 Canada .................................. 180278

[52] U.S. Cl. ................. 159/47; 159/1 S; 159/16 R; 159/32; 209/11; 23/293 R; 23/306
[51] Int. Cl. ........................... B01b; B01d 1/14; B03b ; B01d 1/00
[58] Field of Search ............. 23/297, 298, 305, 306, 23/307; 202/234; 203/99, 49; 159/1 S, 32, 159/33, 42, 16 R; 423/167; 209/11

[56] References Cited
UNITED STATES PATENTS

| | | | |
|---|---|---|---|
| 681,407 | 8/1901 | Coward | 159/1 S |
| 2,532,924 | 12/1950 | Lesesne | 159/1 S |
| 2,556,185 | 6/1951 | Joscelyne | 159/47 |
| 2,606,820 | 8/1952 | Harms | 159/16 R |
| 3,206,379 | 9/1965 | Hill | 703/49 X |
| 3,642,583 | 2/1972 | Greenberg | 159/42 |

FOREIGN PATENTS OR APPLICATIONS
2,951 1879 United Kingdom ................... 159/32

Primary Examiner—Jack Sofer
Attorney, Agent, or Firm—Charles A. Huggett; Michael G. Gilman

[57] ABSTRACT

A process of dewatering phosphate slimes comprising providing as a phosphate slime a mixture of hydrophilic clay, phosphate salt and at least about 95 percent water; disposing a first time unit's production of such slime in a given unit area to a depth of about 12 to 24 inches exposing such slime in such areas to air at a relative humidity of less than 100 percent and a temperature of at least about 50°F; kneading such mixture during said air exposure for a time sufficient to reduce the proportion of water in said slime by at least about 10 percent; similarly treating a next time unit's production of said slime in a sequentially disposed unit area; continuing disposition and treatment of successive time unit's slime production as aforesaid in a series of such areas, the number of which corresponds to the number of time units necessary to reduce the water content of said first time unit's production of slime said 10 percent minimum; and thereafter disposing a next time unit's production of said slime over said at least 10 percent dewatered first time unit's production of said slime.

7 Claims, 2 Drawing Figures

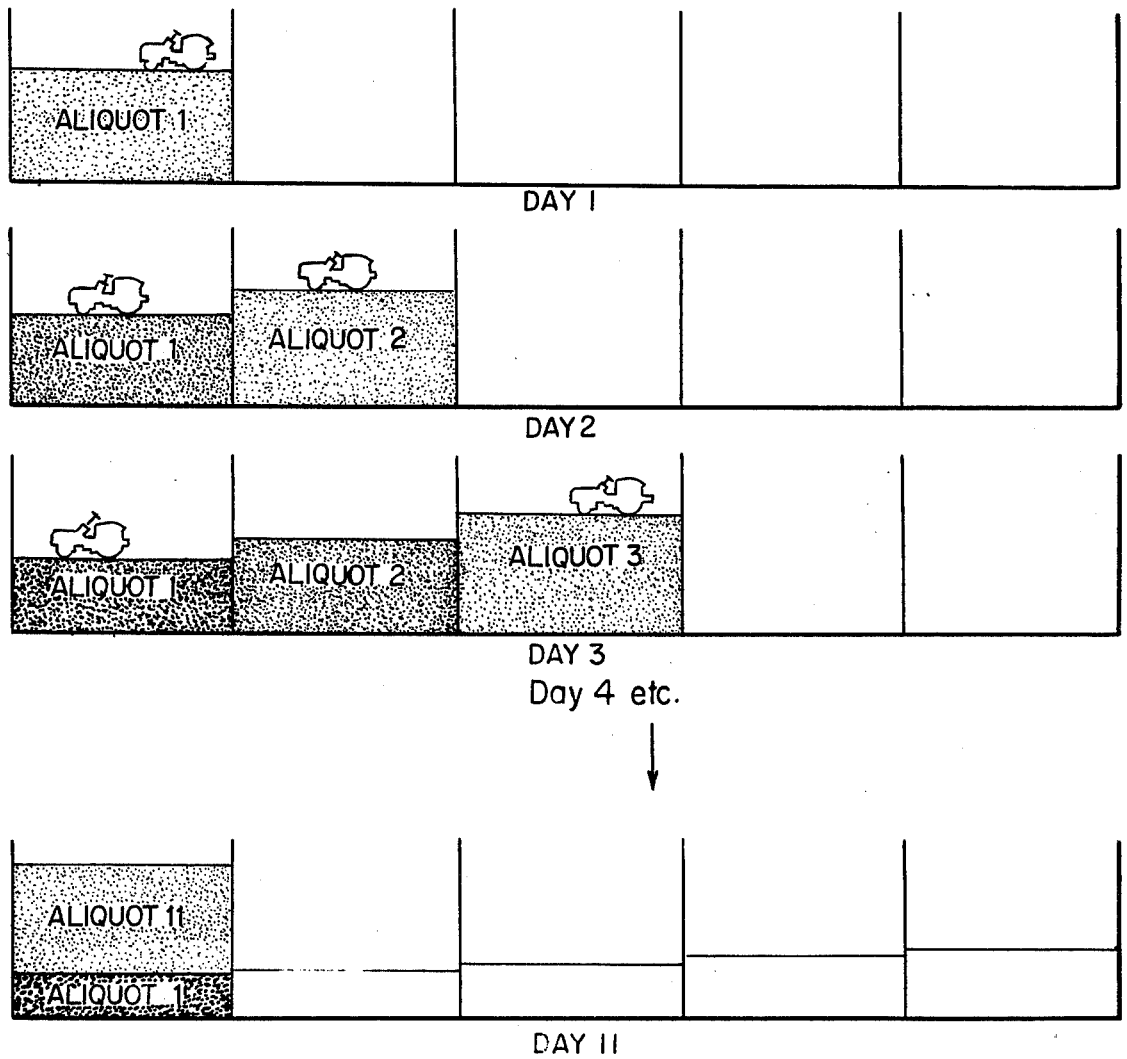

TREATMENT OF PHOSPHATE SLIMES

This invention relates to mining phosphate rock. It more particularly refers to the problem caused by the production of byproduct phosphate slimes.

Phosphate rock is stripmined. The overburden, or agricultural earth, is stripped off and loosely piled; the ore is excavated from under what was the overburden and placed in pits away from the mine area; the overburden is sometimes placed back in the holes from which the ore was excavated; the ore is broken up and slurried with water from high pressure nozzles; the slurry is then passed through a floatation separator where various grades and sizes of phosphate rock (actually pebbles or smaller) are collected and a very thin slurry of clay and phosphate salt in water is created as a byproduct. This byproduct is called phosphate slime and has a solids content of about 1 to 2 percent as produced. This solids content is in a particle size of about −150 mesh, that is colloidal particles. The clays involved are extremely hydrophilic, the water being weakly bonded to the clay particles, with the phosphate salt being carried along in colloidal suspension.

Although phosphate rock has been stripmined in the United States for many years, no one has to date found an effective, economical technique for separating the solids from the water in phosphate slime. This is particularly troublesome because the slime cannot be simply disposed of as such. The colloidal solids tend to clog the gills and suffocate aquatic life if the slime is dumped into a viable body of water. The slime does not effectively dewater by itself in the environment this phosphate is mined in the United States. It is interesting to note that as created, phosphate slime has a solids content of about 1 to 2 percent. If this material is placed in a settling pond, it concentrates by evaporation, settling and decanting to about 5 to 10 percent solids concentration in about 1 month and forms a thin crust. If the slime is permitted to continue to settle and the water evaporate, the solids content rises to about 20 percent after about 20 years. Even so, most of the solids concentrate on the surface in a thick but friable crust, which will support little weight, while the main body of slime below the crust remains mostly liquid.

As was noted above, phosphate rock has been mined in the United States for a considerable period of time, but no solution to this problem has been found. Attempts have been made to add floculating agents to change the pH and to do other things which will assist in dewatering. All attempts which have met with more or less evidence of success have been unacceptable to the phosphate industry because of cost.

It is believed that one of the problems involved in the concentration of phosphate slimes in the United States is the fact that phosphate rock is mined in central Florida, an area of relatively high humidity and high rainfall. It is believed that these climatic conditions tend to prevent dewatering through normal evaporation, particularly in view of the fact that phosphate mined in more arid regions of the world is not subject to the difficulty of phosphate slime disposal. In arid regions, the slime byproduct is simply spread on the desert in a haphazard fashion and the water and colloidal particles just seem to dissipate.

In a completely unrelated technological environment, it is known that dredged river and other body of water bottoms are sometimes extremely hydrophilic in nature. It is often desirable to use such dredgings as land fill, particularly adjacent the dredged body of water. Workers in this field have in the past simply spread the dredgings on the land to be filled and waited for the water content to run off. If it did not run off fast enough or did not evaporate in a sufficiently short time, the dredgings were moved about by conventional earth moving machinery so as to expose more entrapped water for run off and evaporation. This procedure requires that there be a high ratio between the area of land being filled and the volume of dredgings, and it requires a relatively long period of time available for the dewatering of a given volume of dredgings.

It is a peculiarity of the phosphate mining industry that the volumes of slime produced are so large and the water content of them is so high that there has in the past been provided neither time nor disposal land area for dewatering of the type which has been practiced with dredgings. Phosphate slime has therefore simply been stored in rather large, deep dyked areas. The tailings from the ore beneficiation process have, together with some overburden, been piled into very high earthenwork dams or dykes surrounding many hundreds of acres of land. The phosphate slime has been pumped into these dyked areas to a considerable depth and simply been permitted to sit there over the years with more of the same piled on top. As one "lake" is filled, another is created and filled and so on. Since the water never fully or even substantially evaporates or runs off, these lakes of slime never have become useful, productive land, nor has the land been permitted to return to its natural, virgin state, nor could it be. The dykes need continual maintenance and attendance because should a leak occur, the slime will, and has at some times in the past, run out, which may severely damage the surrounding countryside including the ecology of rivers or streams in the area.

It is therefore an object of this invention to provide novel means of dealing with the phosphate slime problem.

Other and additional objects of this invention will become apparent from a consideration of this entire specification including the claims appended hereto.

Understanding of this invention will be facilitated by reference to the drawing in which:

FIG. 1 shows a plan view of a series of sequential points adapted to use in this invention; and FIG. 2 shows an elevation of the points of FIG. 1 in a series of sequential situations spaced apart by a single time unit.

In accord with and fulfilling these objects, one aspect of this invention resides in a process comprising depositing a limited quantity of phosphate slime equivalent to the production thereof from ore beneficiation for a limited time, for example and preferably about 1 day's production, in a first area to a depth of about 12 to 24 inches. This depth maybe greater or lesser as desired but is selected as a function of the ability to knead the slime as will be further explained, below. This first aliquot of slime is exposed to air under conditions conducive to evaporation of water therefrom into air while simultaneously, continuously or intermittently, kneading or breaking up the slime. In this same manner subsequent equivalent production aliquots of phosphate slime are layed out or deposited under similar condition in successive areas of equivalent size to equivalent depths and kneaded while exposing such to air under evaporation inducing conditions. After some given number or production aliquots of phosphate slime are sequentially laid down, the first aliquot has become sufficiently dewatered by decantation and evaporation and to receive a fresh batch of phosphate slime on top of the now more concentrated mixture of hydrophilic clay and phosphate salt. It will be readily seen that this process is cyclical. Rate of dewatering, which is a function of the evaporation inducing conditions such as ambient air temperature and humidity, wind factors, rainfall, etc., is the only independent variable. These process parameters will obviously vary for different locations. Once the rate of dewatering is established for a given thickness of fresh phosphate slime to a specific, acceptable solids content the number of areas can be calculated. With this value in hand it is possible and practical to evaluate the area to be covered by a given aliquot of slime byproduct and the production time relationship to that given area.

One of the essential features of this invention is the use of sequential dewatering, that is, depositing a given finite amount of slime in a given area; when that area has been filled to the required depth or even during filling thereof, to knead that area while exposing it to ambient air under dewatering conditions; to then fill a second similar area and treat it in a similar manner; after the second area is filled to the required depth to fill a third area and similarly treat it and so forth. The number of sequential areas used is a function of the dewatering time of any given area to any given solids content. These are really economically dependent variables. If the production of slime is at a very low rate and there is a large amount of land available upon which to deposit the slime, the layer depth of each aliquot might be made very small, e.g., up to about 12 inches. On the other hand, a higher producing rate facility might require the layed depth in each aliquot to be greater because of higher volume of slime and possibly less land upon which to put it.

In any case, it will be appreciated that the heart of this invention is not so much in the depth of beds of phosphate slime or even in kneading each bed, but rather in the application of these two techniques to the phosphate slime problem coupled with the use of time related sequential bed dewatering. It might be said that this invention is in the nature of a new and unobvious adaptation and use of a known process from a diverse technology to solve a given problem that has plagued a large industry for decades.

As was noted previously, phosphate slime is presently stored behind dykes to great depths. Since it does not dewater to any significant extent with time, at least in central Florida, the depth of these lakes of slime does not appear to change. Therefore, the slime lakes can support only a minimum of weight even after "residing" for 20 years or more. It is possible that eventually after some unknown time they might support agriculture, even habitation thereon. In the meantime, however, they serve no useful purpose, other than merely storage. In the system disclosed herein, a thin layer of phosphate slime is dewatered in a very limited time to an extent sufficient to support relatively heavy machinery thereon at least heavy enough to be used for agricultural purposes. Further, the dewatering accomplished according to this invention causes a considerable reduction in volume which, because the surface area of each aliquot of slime deposited remains substantially constant, translates directly into depth reduction. Thus, if phosphate slime is concentrated to a 50 percent solids level, its depth will be reduced to about half of what it was in the as produced condition. This combination of significant depth reduction coupled with the significantly greater stability against flow and weight supporting character now make possible the use of this concentrated material as land fill at least for agricultural purposes. In other words, by practicing this invention, orange groves can grow where slime lakes existed before.

In an exemplary and possibly economically preferred embodiment of this invention, each aliquot of phosphate slime is 1 day's production thereof, each such aliquot is deposited in an area large enough so that its depth is only about 12 to 24, preferably about 18 inches, kneading is accomplished by running machinery, including but not limited to, earth moving machinery such as bulldozers, hover craft or rollers over or through the surface and continually breaking up the surface, and there are about 10 to 20 aliquot receiving areas.

It was noted above that according to this invention, the phosphate slime is dewatered by exposing it to ambient air under evaporation inducing conditions. It is common knowledge that evaporation rate is increased by either increasing the ambient air temperature without increasing its absolute humidity over its original level, or reducing the absolute water content of the ambient air without decreasing its temperature below its original level, or some combination of the two. It is also common knowledge that hot water will evaporate at a faster rate than cold water into equivalent relative humidity air. From these facts one could reason that the problem of phosphate slime dewatering can be readily solved by one or a combination of three obvious expedients; heat the slime, heat the air to which it is exposed and/or reduce the water content of the air to which it is exposed. These simple, direct approaches to the problem may be technologically sound but each requires the expenditure of energy which costs money and there is little if any ability to put these expedients into practice under current economic conditions. Therefore, while any one or more of these evaporation aids is quite useful as an adjunct to the practice of this invention, economics dictate that they should not be relied upon to accomplish the major dewatering if conventional heating and humidity lowering techniques are used to accomplish them.

A further aspect of this invention resides in combining certain particular dewatering aids with the basic precepts defined, supra. The "hot house effect" is well known scientific principle. If a space is enclosed in a substantially transparent roof shaped so as to reflect as little of the sun's incident radiation and to transmit as much of it as possible, there is accomplished a net solar heating of the contents enclosed under such roof. Under normal hot house utilization circumstances, there is considerable radiant heat absorption and some convective heating of the hot house contents. Thus, a hot house roof constructed over a phosphate slime deposit area tends to increase the temperature of both the slime and the air entrapped in the hot house. This temperature increase in turn causes a reduction in relative humidity of the air (thereby increasing its capacity to accept evaporated water). The temperature increase in the slime itself causes an acceleration in the rate of water evaporation therefrom. The combination of the two effects of hot housing the slime significantly increases its rate of dewatering at a minimum economic penalty, simply the capital cost of the hot house.

Air within the referred to hot house, now laden with a greater amount of moisture than air outside the hot house due to evaporation effects within the hot house, can be vented to the atmosphere at no ecological penalty since no noxious or other undesirable substance is contained thereby. In fact, air can be circulated through the hot house, preferably across the surface of the slime, by conventional means, e.g., fans or blowers. Since hot air rises, if air is introduced at about the slime surface level and blown along the surface thereof, it picks up heat from the surface of the slime as well as moisture and rises in the hot house. Vents, judiciously arranged in the hot house roof can serve to permit the exit of this hot, moisture laden air and assist in the slime dewatering. If vents are not provided, moisture from this air may tend to condense on the hot house roof. This causes two potential problems; firstly, the condensate may drip back onto the slime. This may not be too bad a situation however, since most of this condensate will stay on the slime surface and is removed by decantation run off. Secondly, a condensate on the hot house roof tends to change, noticeably reduce, the transmission characteristics of the hot house roof material, impairing the solar heating desired.

In this regard, it is considered to be within the spirit and scope of this invention to use a pressure supported hot house. So called air buildings, that is dome shaped materials held aloft by air pumped there into, are widely used to house all sorts of activities. Often they are used to enclose sports facilities, such as tennis courts, especially during bad weather seasons. According to this aspect of this invention, a dome, of appropriate size and shape to suit its final designed geometry, suitably a semi-cylindrical surface, preferably having a north-south directed axis, is suitably sealed at its lower to ground edges and then raised into appropriate position by pumping air thereinto. The dome is constructed of substantially transparent, flexible, plastic material, such as for example polyvinyl chloride, polypropylene, polyethylene terephthalate or the like, of suitable thickness consistent with its strength characteristics so as to be able to support itself under the conditions of temperature and pressure differential in effect during dewatering. This plastic dome can be vented or not, as aforesaid.

It is a still further aspect of this invention that the air utilized to hold up the referred to plastic hot house roof may be introduced so as to blow across the surface of the slime or it may be introduced through spargers within the slime so as to pass through the slime, be heated by it and pick up water from it during the passage. Air from the hot house atmosphere may be recirculated through spargers if desired.

As was previously noted, it is a necessary part of this invention that the phosphate slime be kneaded and broken up continually or intermittently during dewatering. The practicality of accomplishing this kneading by mechanical means has been set forth above. It is within the spirit and scope of this invention however to accomplish this necessary kneading and breaking up of the dewatering phosphate slime by other means. In particular, part of all of this activity may be accomplished by forcing relatively large quantities of air through the dewatering slime. Phosphate slime is a thixotropic mass. So long as it is kept in motion, it is fairly easy to work. Once it has been allowed to stagnate, it gels such that considerably greater amounts of energy are required to break the gel and make the mass mobile than are required to maintain the mass in a mobile condition. The thixotropic nature of the phosphate slime mass is accentuated as its solids content increases and the clay content thereof holds onto the water content thereof with increasing force. It has been found, however, that if the mass is kept from setting up or gelling, it is much easier to work with and much easier to dewater. Sparging air, particularly warmed air, upon or through the slime may be one technique, possibly together with mechanical agitation, of accomplishing this.

What is claimed is:

1. A process of dewatering phosphate slimes comprising providing as a phosphate slime a mixture of hydrophilic clay, phosphate salt and at least about 95 percent water, said dewatering including run-off of some water; feeding a first time unit's production of such slime on a given unit area to a depth of about 12 to 24 inches; exposing such slime in such area to air at a relative humidity of less than 100 percent and a temperature of at least about 50°F; kneading such mixture during said air exposure for a time sufficient to reduce the proportion of water in said slime by at least about 10 percent by weight based on the total weight of said first time unit's initial feed; similarly feeding and treating another equal time unit's production of said slime in a sequentially disposed unit area immediately upon completing said first time unit's feeding step; continuing feeding and treatment of successive equal timed unit's slime production as aforesaid in substantially equal time and place sequential series of such areas, the number of which corresponds to the number of time units necessary to reduce the water content of said first time unit's production of slime said 10 percent minimum; and thereafter repeating said feeding, exposing and kneading for each said area in the named time and place sequence as many times as necessary to produce the desired amount of harvest from each said area, the initial 10 percent reduction of water in the first time unit's production resulting within the time span of the completed first sequence.

2. A process as claimed in claim 1 wherein the period of time for a sequence is about 1 day and the number of said areas is about 10 to 20.

3. A process as claimed in claim 1 including mechanically kneading and breaking up said slime at least intermittently during said dewatering of each area's production.

4. A process as claimed in claim 3 including passing air at a relative humidty lower than the relative humidity of surrounding air into contact with said slime.

5. A process as claimed in claim 3 including heating said slime.

6. A process as claimed in claim 1 in which said kneading and breaking up said slime during said dewatering is by sparging air therethrough.

7. A process as claimed in claim 6 including heating said air.

* * * * *